(12) United States Patent
Boudreau et al.

(10) Patent No.: US 6,788,692 B1
(45) Date of Patent: Sep. 7, 2004

(54) NETWORK SWITCH LOAD BALANCING

(75) Inventors: Daniel Boudreau, Westford, MA (US);
J. Martin Borden, Littleton, MA (US);
James A. Philippou, Nashua, NH (US);
Shawn Mamros, Arlington, MA (US);
Kerry M. Hannigan, Boston, MA (US); John T. O'Hara, Andover, MA (US); Bernard Farrell, Littleton, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/323,676

(22) Filed: Jun. 1, 1999

Related U.S. Application Data

(60) Provisional application No. 60/132,279, filed on May 3, 1999.

(51) Int. Cl.[7] .................. H04L 12/26; H04L 1/00; H04J 3/14; G06F 11/00; G08C 15/00
(52) U.S. Cl. ............... 370/400; 370/228; 370/404; 370/465; 709/226; 709/243
(58) Field of Search ................... 370/351, 389, 370/400, 479, 235, 354, 355, 222, 228, 404, 231; 709/105, 102, 203, 224, 244, 235

(56) References Cited

U.S. PATENT DOCUMENTS

| | | | | |
|---|---|---|---|---|
| 4,556,972 A | * | 12/1985 | Chan et al. | 370/354 |
| 4,621,359 A | * | 11/1986 | McMillen | 370/235 |
| 5,241,677 A | * | 8/1993 | Nganuma et al. | 709/105 |
| 5,249,290 A | * | 9/1993 | Heizer | 709/105 |
| 5,293,488 A | * | 3/1994 | Riley et al. | 709/244 |
| 5,539,883 A | * | 7/1996 | Allon et al. | 709/105 |
| 5,864,535 A | * | 1/1999 | Basilico | 370/231 |
| 5,918,021 A | * | 6/1999 | Aditya | 709/235 |
| 6,006,264 A | * | 12/1999 | Colby et al. | 709/226 |
| 6,038,668 A | | 3/2000 | Chipman et al. | |
| 6,049,528 A | * | 4/2000 | Hendel et al. | 370/235 |
| 6,070,190 A | | 5/2000 | Reos et al. | |
| 6,070,191 A | * | 5/2000 | Narendran et al. | 709/226 |
| 6,078,943 A | * | 6/2000 | Yu | 709/105 |
| 6,081,524 A | | 6/2000 | Chase et al. | |
| 6,128,279 A | * | 10/2000 | O'Neil et al. | 370/229 |
| 6,208,644 B1 | * | 3/2001 | Pannell et al. | 370/389 |
| 6,252,878 B1 | * | 6/2001 | Locklear, Jr. et al. | 370/401 |
| 6,272,522 B1 | * | 8/2001 | Lin et al. | 709/200 |
| 6,389,448 B1 | * | 5/2002 | Primak et al. | 709/105 |
| 6,400,681 B1 | * | 6/2002 | Bertin et al. | 370/218 |
| 6,421,317 B1 | * | 7/2002 | Denecheau et al. | 370/222 |
| 6,580,715 B1 | * | 6/2003 | Bare | 370/396 |

\* cited by examiner

*Primary Examiner*—Man Phan
(74) *Attorney, Agent, or Firm*—Blakely Sokoloff Taylor & Zafman, LLP

(57) ABSTRACT

The present invention is a method and apparatus to balance load in a cluster of switches in a network. The switches include a local switch and one or more remote switches. Messages containing load information of the switches are exchanged among the switches. One of the switches is selected to respond to a connection request to the local switch based on a metric.

59 Claims, 14 Drawing Sheets

NETWORK SWITCH LOAD BALANCING

RELATED APPLICATION

This application claims the benefit of U.S. Provisional Application No. 60/132,279 filed on May 3, 1999.

BACKGROUND

1. Field of the Invention

This invention relates to communication network. In particular, the invention relates to load balancing.

2. Description of Related Art

The proliferation of computer networks, such as the internet, has resulted in a widespread expansion of the communication market. This expansion leads to demands for high performance network switching technologies. In addition, several network structures have been developed to accommodate the needs of users. Examples of these network structures include intranet and extranet.

Extranet has become popular in business organizations. Communication accesses via extranet eliminates end-user frustrations of busy signals, crackly phone lines, and faulty modems. In addition, Information Technology (IT) management burdens are eased. Users of extranet enjoy the widespread access due to the global service providers. Extranets also offer significant savings by reducing long-distance phone charges and decreasing capital spending.

Business organizations cannot rely on virtual private network (VPN) services and Internet Service Provider (ISP) to provide extranet infrastructure. An extranet switch is typically needed to maximize the benefits of extranets. An extranet switch integrates VPN services, authentication, routing, bandwidth management, firewall, accounting, and simplified management on a user-centric platform.

In large business organizations, there are a number of extranet switches operating in a cluster. In a traditional extranet switch cluster, individual extranet switches operate in an independent manner. Calls from users are treated almost identically. Although this treatment may be acceptable when the network traffic is light, numerous problems arise when the number of calls from users becomes large, or when the extranet switches are overloaded. These problems include a reduced Quality of Service (QoS) in terms of response time and reconnecting time.

Therefore there is a need in the technology to provide a simple and efficient method to balance the load in handling connection requests in a network switch cluster.

SUMMARY

The present invention is a method and apparatus to balance load in a cluster of switches in a network. The switches include a local switch and one or more remote switches. Messages containing load information of the switches are exchanged among the switches. One of the switches is selected to respond to a connection request to the local switch based on a metric for balancing loading with improved quality of service.

Other aspects and features of the present invention will become apparent to those of ordinary skill in the art upon review of the following description of specific embodiments of the invention in conjunction with the accompanying figures.

BRIEF DESCRIPTION OF THE DRAWINGS

The features and advantages of the present invention will become apparent from the following detailed description of the present invention in which.

DESCRIPTION

The present invention is a method and apparatus to balance the load of associated switches in a cluster in response to a connection request. The technique provides a protocol for message exchanges among the switches. A metric is computed based on the number of available sessions corresponding to the request priority and the processor idle time. The selected switch has the best metric among the switches in the cluster.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention. For example, in the following description, the load balancing manager is described in an extranet embodiment, other embodiments involving other types of network switching devices are also applicable.

Figure 1:
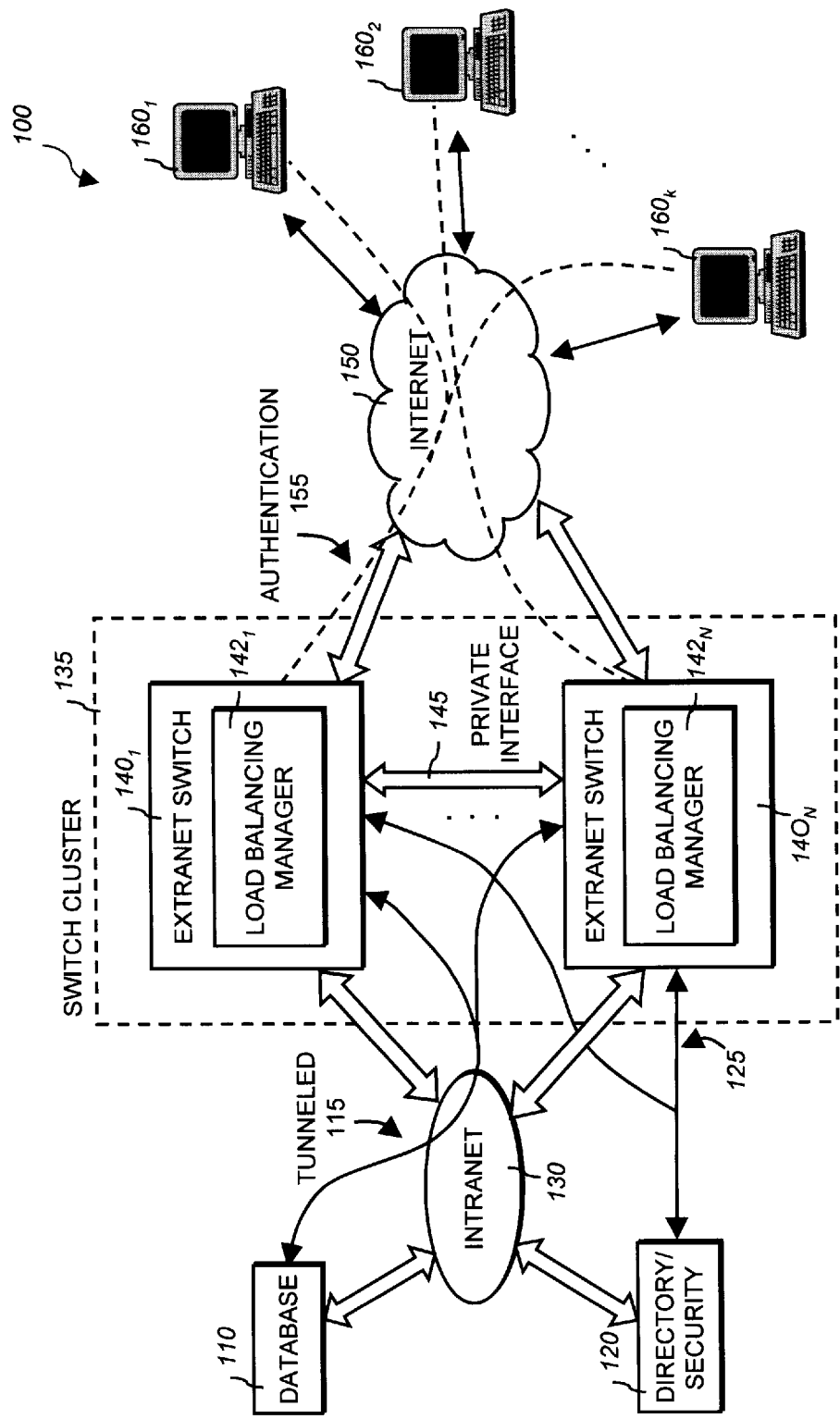
FIG. 1 is a diagram illustrating a system in which one embodiment of the invention can be practiced.

FIG. 1 is a diagram illustrating a system 100 in which one embodiment of the invention can be practiced. The system 100 includes a database 110, a directory/security 120, an intranet 130, a switch cluster 135, an internet 150, and clients $160_1$ through $160_K$. The variables "K", "N", and "M" are representations of an arbitrary positive whole number.

The database 110 stores the data and information of an organization accessible to the clients $160_1$ through $160_K$. The directory/security 120 stores directory and security information of the business organization, the database 110, and the clients $160_1$ through $160_K$. The intranet 130 is a communication network within the organization over which the information from the database 110 and directory/security 120 is exchanged and interfaced to the switch cluster 135.

The switch cluster 135 is an interface between the intranet 130 and the internet 150. The switch cluster 135 includes a number of extranet switches $140_1$ to $140_N$. The extranet switches $140_1$ to $140_N$ include load balancing managers $142_1$ to $142_N$, respectively. The load balancing managers $142_1$ to $142_N$ perform the load balancing function in response to connection requests made by the clients $160_1$ to $160_K$. The extranet switches $140_1$ to $140_N$ exchange messages over a private interface 145. The switch cluster 135 is coupled to the database 110 via a tunneling channel 115 following a tunneling protocol. Examples of a tunneling protocol include Point-to-Point Tunneling Protocol (PPTP) with compression and encryption, Layer 2 Forwarding (L2F), Internet Protocol Security (IPSec), Layer 2 Tunneling Protocol (L2TP), and Internetwork Packet exchange (IPX) with PPTP. The switch cluster 135 is coupled to the directory/security 120 via a channel 125. Authentication 155 may be performed by the switch cluster 135 to authenticate the client $160_1$ to $160_K$.

The internet 150 is the public global network provided by any internet service provider (ISP). The clients $160_1$ to $160_K$ are the users of the extranets in the organization. Examples of the clients $160_1$ to $160_K$ include the employees of the organization, its business partners, and its customers.

Figure 2:
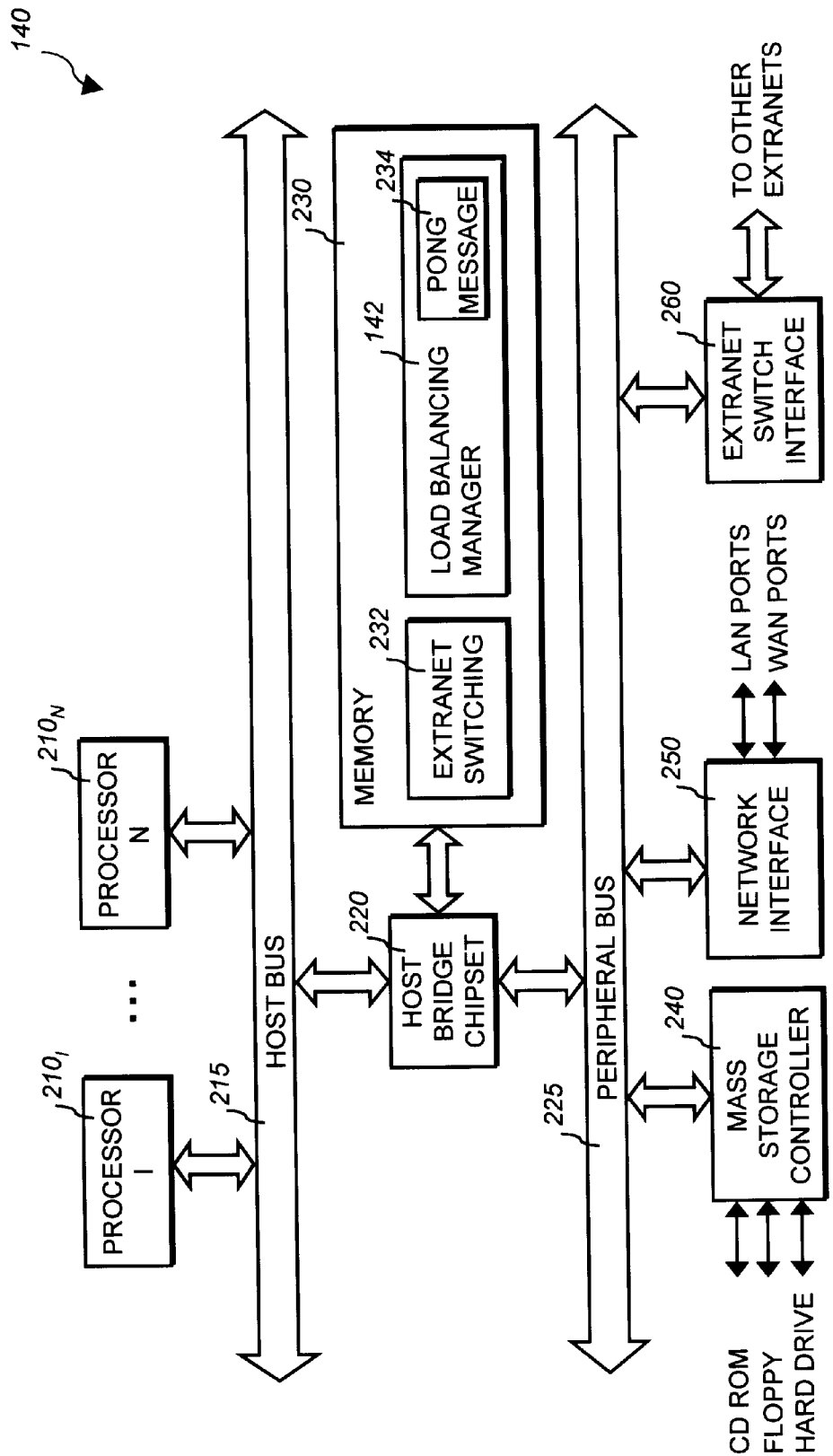
FIG. 2 is a diagram illustrating an extranet switch with load balancing manager according to one embodiment of the invention.

FIG. 2 is a diagram illustrating an extranet switch 140 with load balancing manager according to one embodiment of the invention. The extranet switch 140 is one of the extranet switches $140_1$ to $140_N$ shown in FIG. 1. The extranet switch 140 includes processors $210_1$ to $210_m$, a host bus 215, a host bridge chipset 220, a system memory 230, a peripheral bus 225, a mass storage controller 240, a network interface 250, and an extranet switch interface 260.

Each of the processors $210_1$ to $210_M$ represents a central processing unit of any type of architecture, such as complex instruction set computers (CISC), reduced instruction set computers (RISC), very long instruction word (VLIW), or hybrid architecture. The invention could be implemented in a multi-processor or single processor computer system.

The host bridge chipset 220 includes a number of interface circuits to allow the host processors $210_1$ to $210_M$ access to the system memory 230. The system memory 230 represents one or more mechanisms for storing information. For example, the system memory 230 may include non-volatile or volatile memories. Examples of these memories include flash memory, read only memory (ROM), or random access memory (RAM). The system memory 230 includes an extranet switching 232 and a load balancing manager 142. The extranet switching 232 includes functions to perform extranet switching tasks such as tunneling, authentication, encryption, filtering, bandwidth management, accounting, administration, and other client software. The load balancing manager 142 performs the load balancing function in response to a connection request by one of the clients $160_1$ to $160_K$ (FIG. 1). Of course, the system memory 230 preferably contains additional software (not shown), which is not necessary to understanding the invention. The load balancing manager 142 includes an advertisement message 234, referred herein as a "Pong message", as part of the load balancing protocol. The Pong message 234 contains the load information of the extranet switch.

When implemented in software, the elements of the load balancing manager 142 are essentially the code segments to perform the load balancing function and manage the communication protocol among the switches in the cluster. The program or code segments can be stored in a processor readable medium or transmitted by a computer data signal embodied in a carrier wave over a transmission medium. The "processor readable medium" may include any medium that can store or transfer information. Examples of the processor readable medium include an electronic circuit, a semiconductor memory device, a read-only memory (ROM), a flash memory, an erasable ROM (EROM), a floppy diskette, a compact disk (CD) ROM, an optical disk, a hard disk, a transmission medium, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, intranet, etc.

The peripheral bus 225 provides interface to peripheral devices. In one embodiment, the peripheral bus 225 is the Peripheral Component Interface (PCI) bus. The mass storage controller 240 provides interface to a number of mass storage devices such as compact disk read only memory (CDROM), floppy diskettes, and hard drives. The network interface 250 provides interface to a communication channel or medium such as a local area network (LAN) port and a wide area network (WAN) port. The network interface 250 may provide the interface for downloading the code segments for the load balancer over a communication channels. The extranet switch interface 260 provides a communication channel to other extranet switches in the cluster via the private bus 145 shown in FIG. 1. In particular, the extranet switch interface 260 broadcasts the Pong message 234.

The Pong protocol is a method for the switches in a cluster to exchange information about their current load. Each switch is configured to know the internet protocol (IP) address of every other switch in the cluster. Periodically, each switch transmits a unicast packet with a specified port destination to every other switch of the cluster as an advertisement of its load. The protocol therefore treats all switches of a cluster symmetrically. The message format is designed to allow for generalization and future upgrade.

Figure 3:
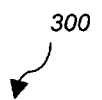
FIG. 3 is a diagram illustrating a message format for the load balancing protocol according to one embodiment of the invention.

FIG. 3 is a diagram illustrating a message format 300 for the load balancing protocol according to one embodiment of the invention. The message format 300 corresponds to Pong message 234. The message format 300 includes a number of fields corresponding to the load information for each switch. The size of each field is dependent on the specific implementation. In one embodiment, each line as shown in FIG. 3 corresponds to a 32-bit word. The message format 300 includes a protocol header field 310, a source internet protocol (IP) address field 320, an interface IP address field 330, a checksum and processor idle field 340, a free connection field 350, reserved fields 362 and 364, and an authentication data field 370.

The protocol header field 310 contains four subfields: version, message type, refresh interval, and authentication method. The version subfield indicates the version of the load balancing manager. The message type subfield indicates the type of message exchange in the load balancing manager. An example of a message type is the advertisement message which is a message sent by a switch to other switches in the cluster to broadcast its load information and other switch attributes. The refresh interval subfield indicates the time interval in seconds between the sending of the messages. The authentication method subfield indicates the type of authentication used by the load balancing manager. Examples of the type of authentication includes no authentication and Secure Hash Algorithm (SHA).

The source IP address field 320 contains the system IP address of the switch originating the message. It is also the address that a peer switch should use as the IP destination of its Pong messages when addressing the originating switch. The source IP address field 320 should be the same as the source field of the IP header in the packet carrying this Pong message.

The interface IP address field 330 contains the IP address of a public interface on the switch originating the message. It is the IP address for a client to use when establishing a tunnel to the system.

The checksum and processor idle time field 340 contains a checksum subfield and a processor idle time subfield. The checksum subfield contains the checksum of the sum of all fields in the message. The checksum is used for error detection. In one embodiment, it is the one's complement of the 16-bit one's complement sum of all fields in the message, using the same method as for the IP headers. The processor idle time subfield contains an estimate of the percentage of time the processor or the central processing unit (CPU) on the switch has recently been idle. It has a range from 0 to 100.

The free connection field 350 includes a number of subfields based on the number of Quality of Service (QoS) priorities. The QoS priority is usually assigned in advance to the clients $160_1$ to $160_K$. The QoS may refer to the importance of a user for the organization and the type of priority handling they should receive from a given switch. As an example, a user who wants to access a disk file might have a lower QoS than a user who wants to use the connection to make an internet telephone call or video conference. In one embodiment, there are four levels of priority and the free connection field 350 has four free connection subfields with priority level from 0 to 3. The free connection priority 0 subfield contains the number of available slots or sessions for the login of new users with the QoS connection priority level 0. The free connection priority 1 subfield contains the number of available slots or sessions for the login of new users with the QoS connection priority level 1. The free connection priority 2 subfield contains the number of available slots or sessions for the login of new users with the QoS connection priority level 2. The free connection priority 3 subfield contains the number of available slots or sessions for the login of new users with the QoS connection priority level 3.

The reserved fields 362 and 364 are reserved for future use. Typically, the reserved fields 362 and 364 are set at a predetermined values. In one embodiment, they are set at zeros.

The authentication data field 370 contains the authentication data corresponding to the authentication method subfield in the protocol header field 310. If the authentication method subfield indicates that there is no authentication, the authentication data field 370 contains a predetermined value, e.g., zeros. If the authentication method subfield indicates hash-based authentication method (e.g., SHA-1), then the authentication subfield 370 contains data, normally a message digest, computed by the selected hash function.

Figure 4:
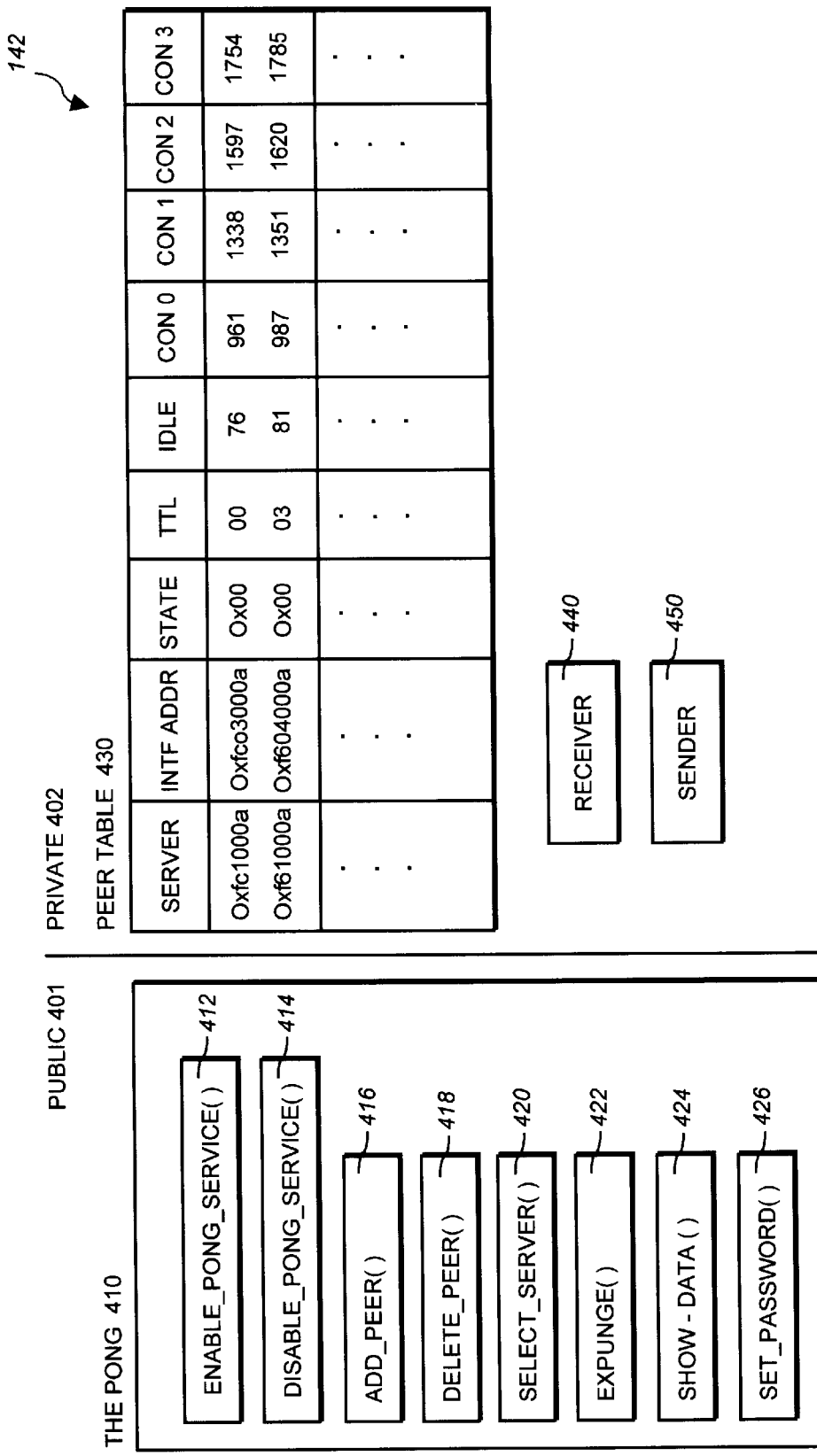
FIG. 4 is a diagram illustrating an implementation of the load balancing manager according to one embodiment of the invention.

FIG. 4 is a diagram illustrating an implementation of the load balancing manager 234 according to one embodiment of the invention. The load balancing manager 234 has a public interface 401 and a private implementation 402.

The public interface 401 has one global instance of the class PongCls in the system, referred to as the Pong 410. The PongCls has the following public functions: an Enable__ Pong__Service 412, a Disable__Pong__Service 414, an Add__Peer 416, a Delete__Peer 418, a Select__Server 420, an Expunge 422, a Show__Data 424, and a Set__Password 426.

Enable__Pong__Service 412 starts the Pong service. Disable__Pong Service 414 stops the Pong service. Add__ Peer 416 adds a peer server to the cluster configuration. Delete__Peer 418 deletes a peer from the cluster configuration. Select__Server 420 implements the server decision problem to select the switch to respond to a connection request. The server decision will be described later. Expunge 422 is more drastic than Disable__Pong Service 414 in that it disables the Pong service and reclaims all system resources that were used by the Pong service. Show__Data 424 dumps internal data about the server state. Set__ Password 426 is used internally to set the password for the SHA.

The private implementation 402 includes a peer table 430, a receiver 440, and a sender 450. Accesses to the peer table 430 typically require a binary semaphore.

The peer table 430 stores load information of the peer switches. Each row of the peer table 430 corresponds to some peer server. The load information contains several switch attributes. Examples of the switch attributes include the unique IP address of the server (server), the address of the interface for clients to use on the server (intf addr), the state of the server (state), the time-to-live (TTL) of the server, the processor idle time (idle), and the number of available sessions for each QoS connection priority (con0, con1, con2, and con3). The state of the server is either normal or delete__requested. The normal state indicates that the server is operating normally. The delete__requested state indicates that the server is being removed from the system.

The receiver 440 implements the receive function to receive a Pong message. The sender 450 implements the send function to send a Pong message. The receiver 440 and sender 450 are spawned when Enable__Pong__Service 412 is called. Disable__Pong__Service 414 sets a flag to inform the receiver 440 and the sender 450 that nothing should be performed.

Add__Peer 416 searches the peer table 430 for an empty address and inserts a row. Then, the TTL is set to a predetermined maximum value. In one embodiment, this maximum value is "4". If there is no empty row available to use, Add__Peer 416 returns FALSE. Delete__Peer 418 changes the state value from normal to delete requested. Expunge 422 closes all sockets and kills the receiver 440 and sender 450.

Figure 5:
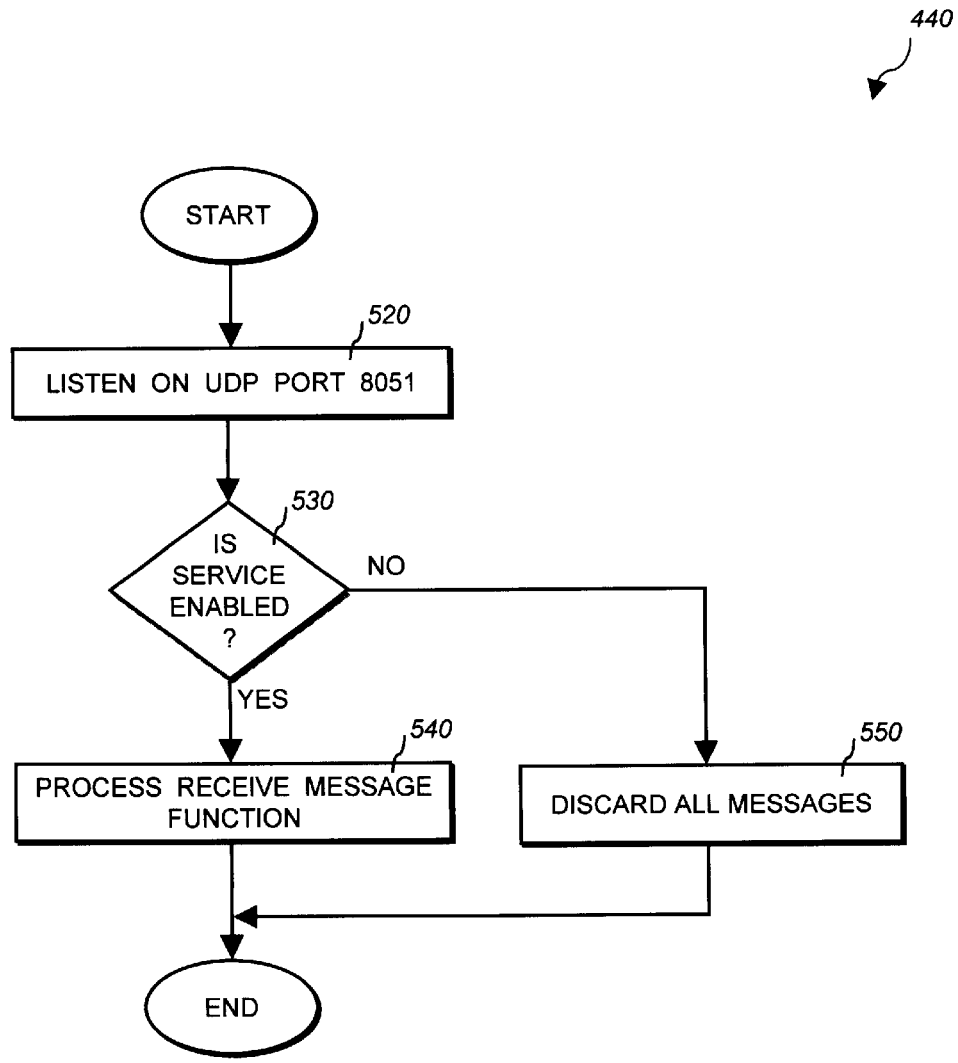
FIG. 5 is a flowchart illustrating a process to receive a Pong message according to one embodiment of the invention.

FIG. 5 is a flowchart illustrating a receiver process 440 to receive a Pong message according to one embodiment of the invention.

At start-up, the process 440 listens to the unicast port (Block 520). When a Pong message is received, the process 440 determines if the service is enabled (Block 530). If the service is not enabled, the process 440 discards the messages (Block 550) and is then terminated. If the service is enabled, the process 440 performs the receive message function (Block 540) and is then terminated. Typically, the process 440 represents one iteration in a continuous loop. The loop is terminated when the system is closed down.

Figure 6:
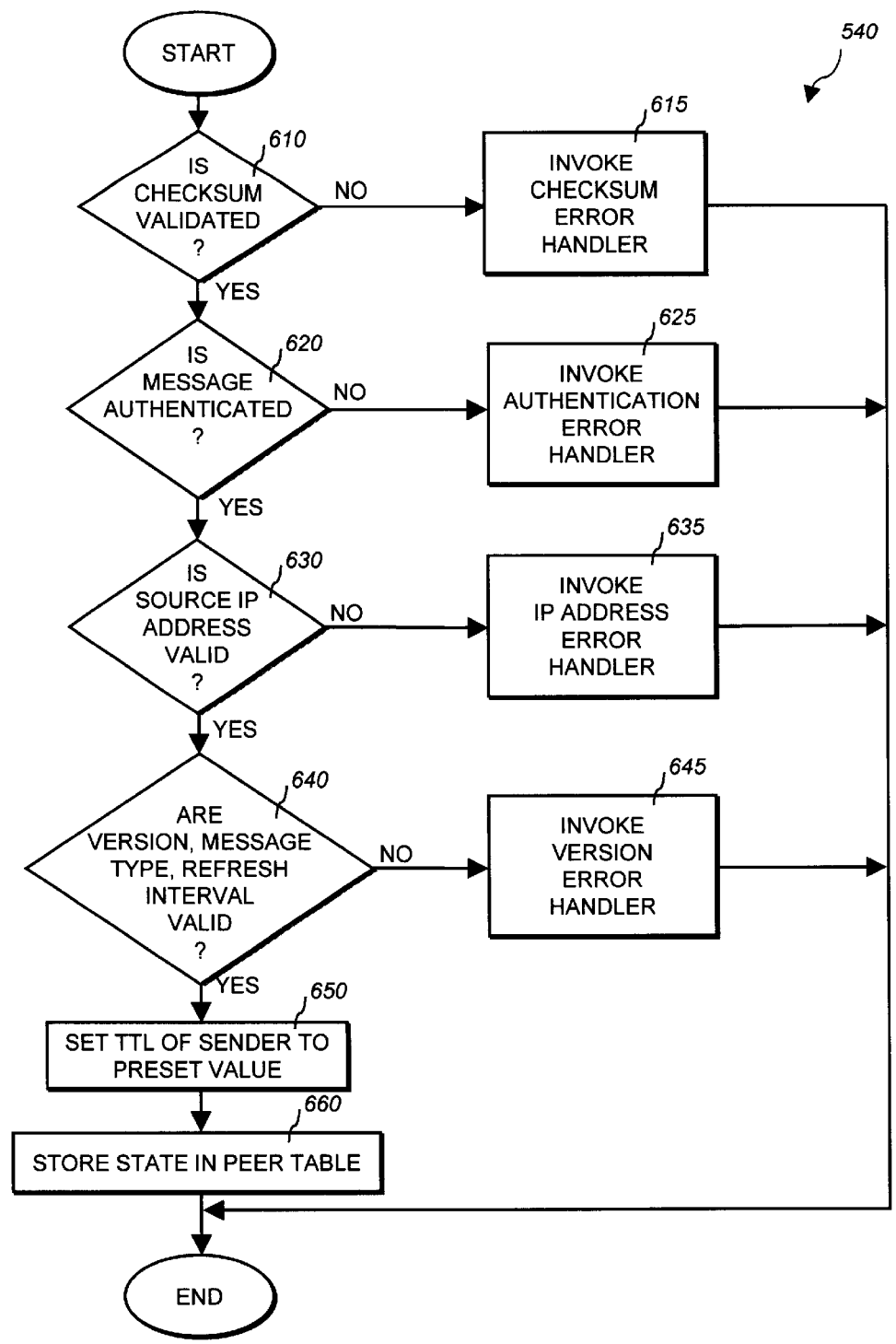
FIG. 6 is a flowchart illustrating a process to process a received Pong message according to one embodiment of the invention.

FIG. 6 is a flowchart illustrating a process 540 to process a received Pong message according to one embodiment of the invention.

At start-up, the process 540 determines if the checksum is validated (Block 610). If not, the process 540 invokes a checksum error handler (block 615) and is then terminated. Otherwise, the process 540 determines if the message is authenticated by performing the authenticating procedure (Block 620). If the message is not authenticated, the process 540 invokes an authentication error handler (625) and is terminated. If the message is authenticated, the process 540 determines if the source IP address of the received message is valid (Block 630). If the source IP address is not valid, the process 540 invokes the IP address error handler (Block 635) and is terminated. If the source IP address is valid, the process 540 determines if the version, the message type, and the refresh interval are valid (Block 640). If these data are not valid, the process 540 invokes the version error handler (645) and is then terminated. If these data are valid, the process 540 sets the TTL of the sender to a preset value, e.g., 4 (Block 650). Then the process 540 stores all the switch attributes in the peer table (Block 660). Then the process 540 is terminated.

Figure 7:
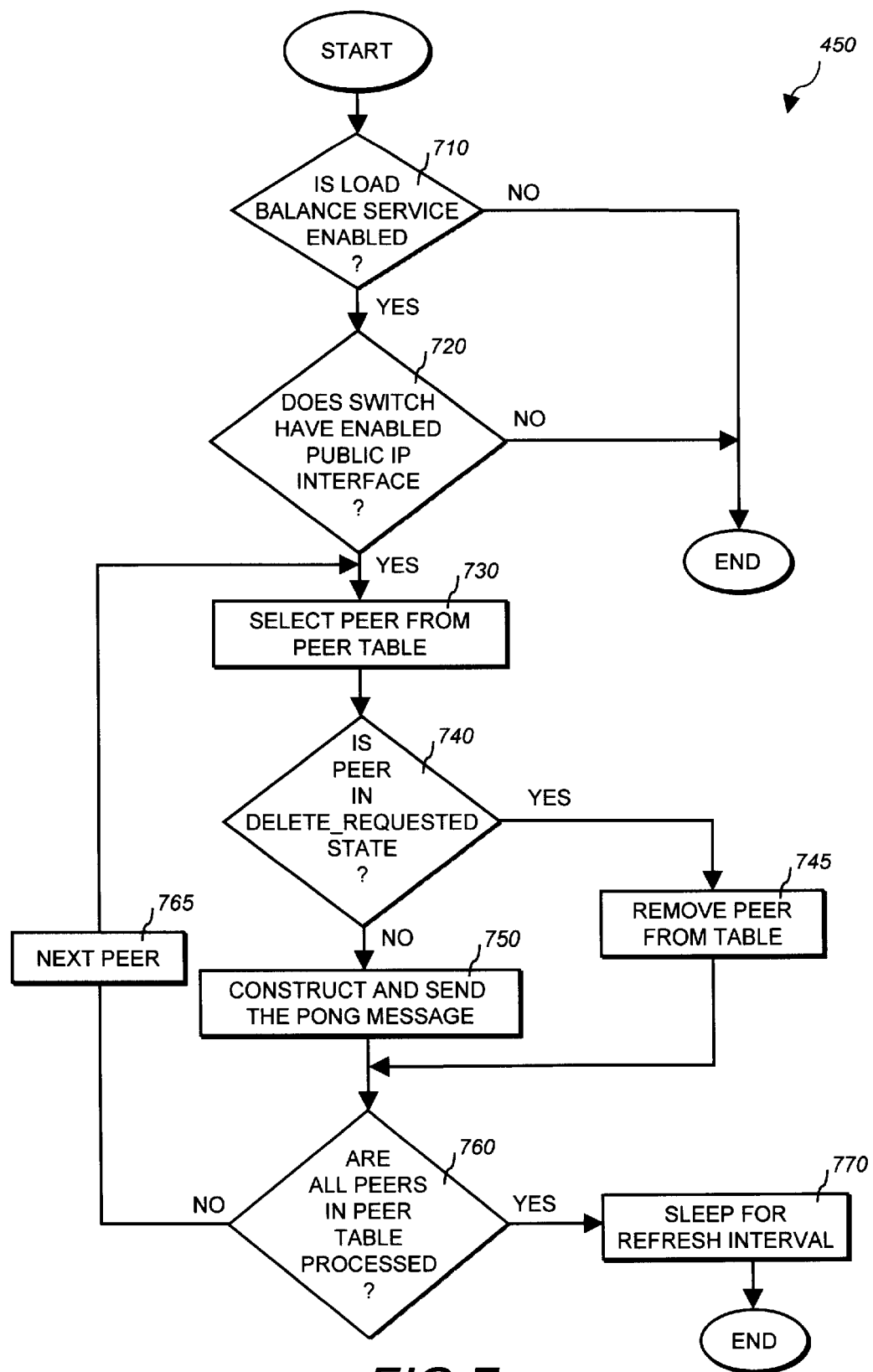
FIG. 7 is a flowchart illustrating a process to transmit a Pong message according to one embodiment of the invention.

FIG. 7 is a flowchart illustrating a sender process 450 to transmit a Pong message according to one embodiment of the invention.

At start-up, the process 450 determines if the load balance service is enabled (Block 710). If not, the process 450 is terminated or does nothing until the service is enabled. If the load balance service is enabled, the process 450 determines if the switch has enabled public IP interface (Block 720). If not, the process 750 is terminated because sending the Pong message is not allowed. If the switch has enabled public IP interface, the process 450 selects a peer switch from the peer table (Block 750).

The process 450 determines if the state of the selected peer switch is in the delete_requested state (Block 740). If yes, the process 450 removes the peer from the peer table (Block 745) and proceeds to block 760. If the peer is not in a delete_requested state, i.e., if it is in the normal state, the process 450 performs the send function by constructing the Pong message (Block 750). Then the process 450 determines if all peers in the peer table have been processed (Block 760). If not, the process 450 updates the pointer to next peer in the peer table (Block 765) and goes back to block 730 to select the peer. If all peers have been processed, the process 450 sleeps for a time shown in the refresh interval (Block 770). In one embodiment, this time interval is 9 seconds. Then the process 450 is terminated. Typically, the process 450 represents one iteration in a continuous loop.

Figure 8:
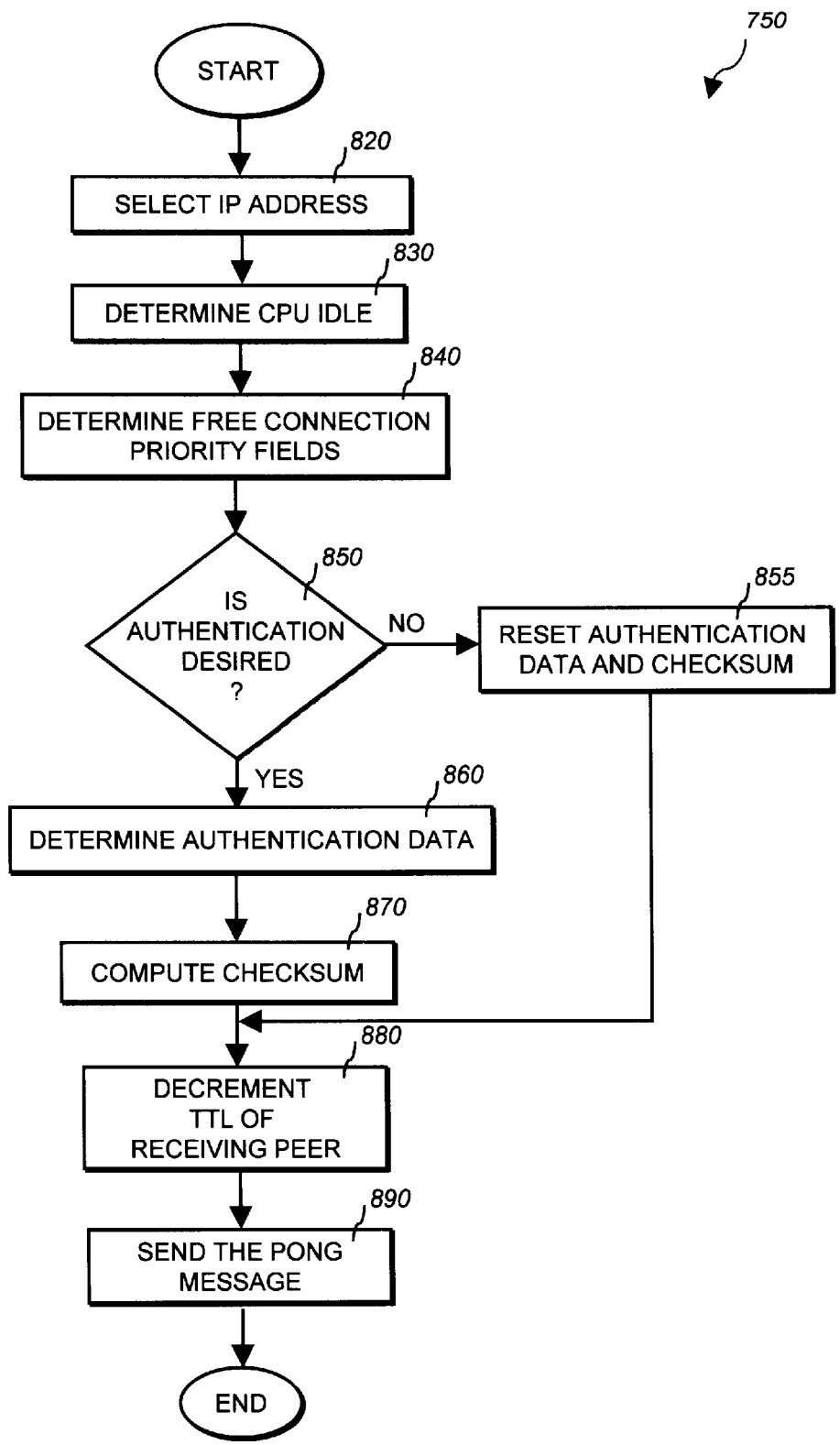
FIG. 8 is a flowchart illustrating a process to construct a Pong message for transmission according to one embodiment of the invention.

FIG. 8 is a flowchart illustrating a process 750 to construct a Pong message for transmission according to one embodiment of the invention.

At start-up, the process 750 selects the IP address (Block 820).

Next, the process 750 determines the processor idle time (Block 830). The procedure to determine the processor idle time will be described later. Then the process 750 determines the free connection priority values (Block 840). Next, the process 750 determines if authentication is desired by checking the authentication method subfield (Block 850). If authentication is not desired, the process 750 resets the authentication data and the checksum (Block 855) and goes to block 880. If authentication is desired, the process 750 determines the authentication data using the specified procedure, e.g. the SHA (Block 860). Then the process 750 computes the checksum (Block 870). The process 750 then decrements the TTL of the receiving or destination peer switch (Block 880). Then the process 750 sends the Pong message as constructed above and according to the message format 300 as shown in FIG. 3. Then the process 750 is terminated.

The server decision is a decision to decide which switch of the cluster is best equipped to handle an incoming call or a connection request from a user with a connection priority p. The decision is based on a scalar figure of merit, or metric, for each switch in the cluster. The metric expression is:

Metric=(number of available sessions at priority p)*(% processor idle time)  (1)

A higher value of the metric indicates more desirability of using the switch. Therefore, after the metrics of all the switches in the cluster are computed using the above expression (1), the switch that has the highest value of the metric is selected as the switch to respond to the connection request.

The processor idle time provides an indication of how busy the processor in a switch is. A switch that is normally eligible to receive transferred connection requests may set the processor idle time to zero in its advertisement to indicate that it is unwilling to accept any new connection requests. However, even if a switch does set its processor idle time to zero, it may receive connection requests.

The processor idle time is determined based on two considerations: the sampling of past samples and the calculation of the estimate. The processor idle time is estimated based on the history of a predetermined number of tasks that the processor has been running for over a predetermined period, backwards from the current time. By counting the number of times the idle task is in this list of samples, an estimate of the percentage of the idle time can be obtained. In one embodiment, the period of sampling the past task samples is 3 seconds.

To avoid synchronizing with periodicities in system tasks, a random sampling is used. In one embodiment, this random sampling is based on a Poisson distribution. In estimating the average, it is desirable to dampen momentary peaks and look for longer term trends. In one embodiment, the estimate is calculated using an autoregressive moving average process such as an exponentially weighted moving average (EWMA) given by the following expression:

New_Average=A*New_sample+B*Old_Average  (2)

where A and B are two constants. In one embodiment, $A=1/16$ and $B=15/16$.

In the absence of other considerations, the decision to select the best switch to respond to a connection request can be based on pairwise comparisons of the switch metrics.

Figure 9:
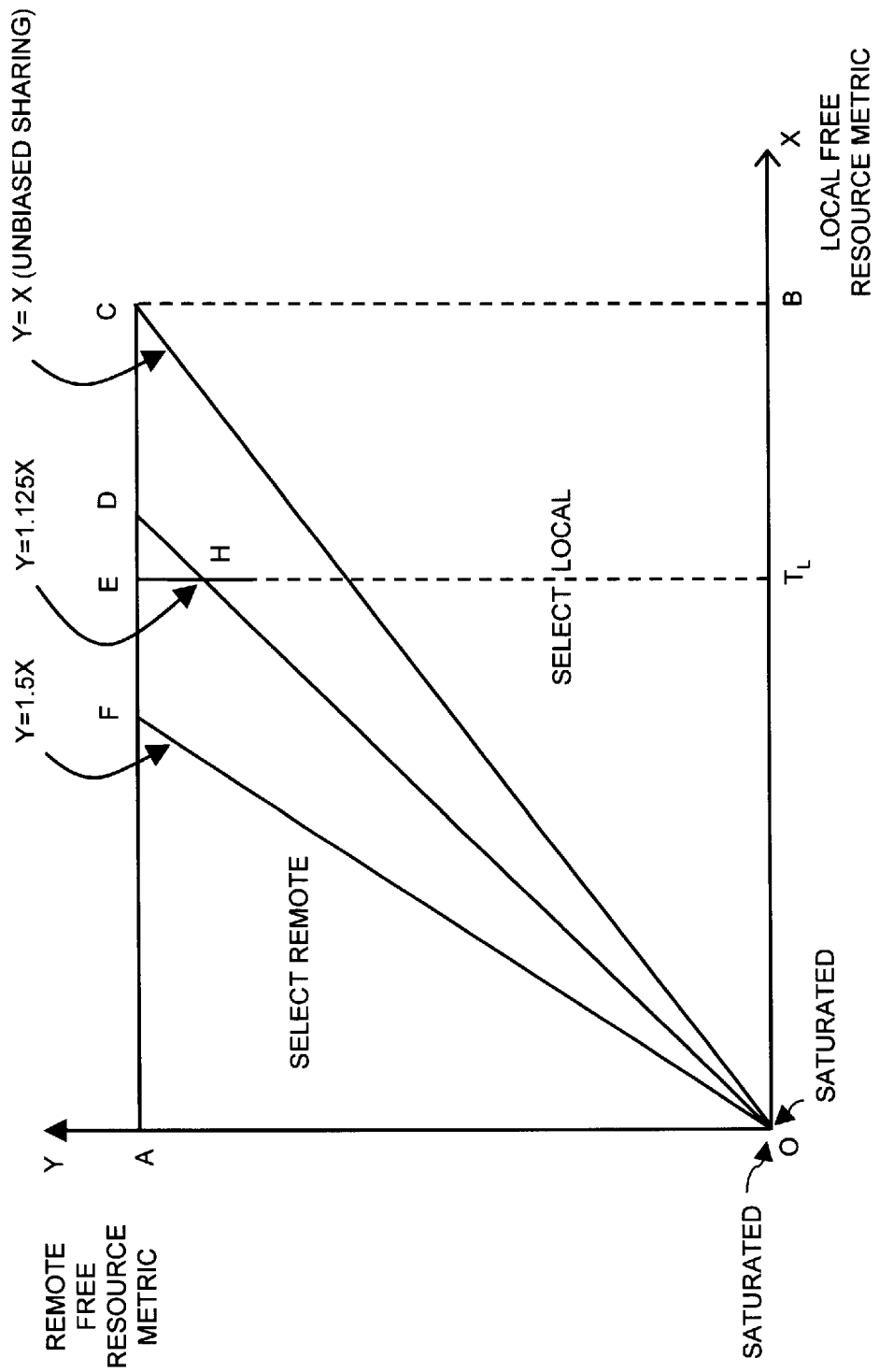
FIG. 9 is a diagram illustrating a server decision according to one embodiment of the invention.

FIG. 9 is a diagram illustrating a server decision according to one embodiment of the invention. The server decision is based on the free resource metrics of a remote switch and a local switch. A local switch is the switch with which the user tries to connect. The remote switch is the alternate switch where the user connection will be redirected if it is determined that the remote switch can service the user connection more efficiently. Examples of the free resource include the processor idle time and the number of available sessions in the switch.

The horizontal X and the vertical Y axes correspond to the free resource metrics of the local and remote switches, respectively. At the origin of the coordinate system, both the local and remote switches are saturated, i.e., there are no free resources.

The line Y=X corresponds to the unbiased sharing where the local and remote switches have equal free resources. The region above the Y=X line, i.e., the triangle OAC, corresponds to conditions where the remote has more free resources than the local. The region below the Y=X line, i.e., the triangle OBC, corresponds to conditions where the local has more free resources than the remote. However, the decision to redirect the incoming call to a remote switch is not simply based on whether which switch has more free resources because there is a fair amount of overhead in asking the client to reconnect to a different switch.

To take into account this overhead, some bias in the decision process is introduced. There are two elements of this bias. First, there is a local threshold $T_L$. If the local switch has a metric value above $T_L$, then no redirect to the remote should be done, regardless of the remote metric. Second, the remote should be somewhat more desirable than on the line of unbiased sharing before redirecting the client. In other words, a redirection overhead should be incorporate in the metric to make the redirection worthwhile. This redirection overhead is reflected by a predefined percentage as the amount the remote metric should exceed the local metric before redirecting is used. In one embodiment, this predefined percentage is 12.5%. This is expressed as the line Y=1.125X. Therefore, the region defined by the polygon OHECB corresponds to the region to select the local switch, and the region defined by the polygon OAEH corresponds to the region to select the remote switch.

Additional information may be exploited to provide further refinement to the decision process. For example, the reliability of the information from the remote switch can be used. The reliability of the information can be reflected by the TTL state information.

As the TTL of a peer switch decays, the information about the switch becomes less reliable. At some point, say TTL≤1, it may be necessary to be stringent about redirecting a client to that switch. For example, the redirecting is done when the remote switch has a metric exceeding 1.5 times the local switch. This is shown as the line Y=1.5X. In this example, the region defined by the polygon OFCB corresponds to the region to select the local switch, and the region defines by the triangle OAF corresponds to the region to select the remote switch. In addition, if the TTL is 0, the remote switch is considered dead and should not be selected.

The region near the origin of the graph represents instability and the decision to switch should be made with more careful considerations.

Figure 10A:
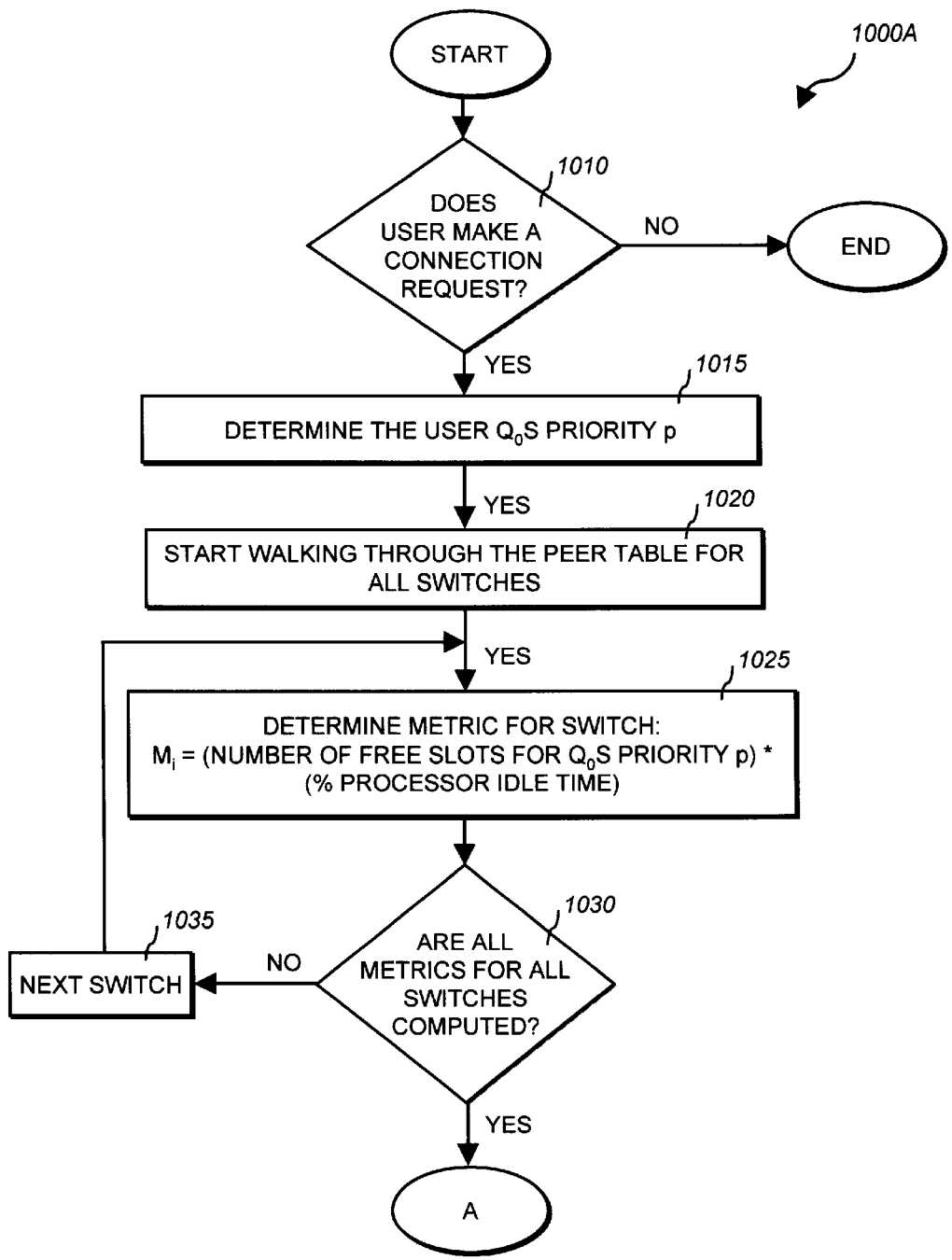
FIG. 10A is a flowchart illustrating a process to determine metrics of switches according to one embodiment of the invention.

FIG. 10A is a flowchart illustrating a process 1000A to determine metrics of switches according to one embodiment of the invention.

Upon START, the process 1000A determines if a user has made a connection request (Block 1010). If not, the process 1000A is terminated. Otherwise, the process 1000 determines the user QoS priority p (Block 1015). The user QoS priority information is usually included in the packet sent by the user at the time of connection request. Then the process 1000A starts walking through the peer table for all the switches (Block 1020). For a switch i, the process 1000A determines a metric $M_i$=(number of free slots for QoS priority p)*(% processor idle time) (Block 1025). Then the process 1000A determines if all metrics for all switches have been computed (Block 1030). If not, the process 1000A updates the switch pointer to the peer table (Block 1035) and goes to block 1025. Otherwise, the process 1000A begins the decision process.

Figure 10B:
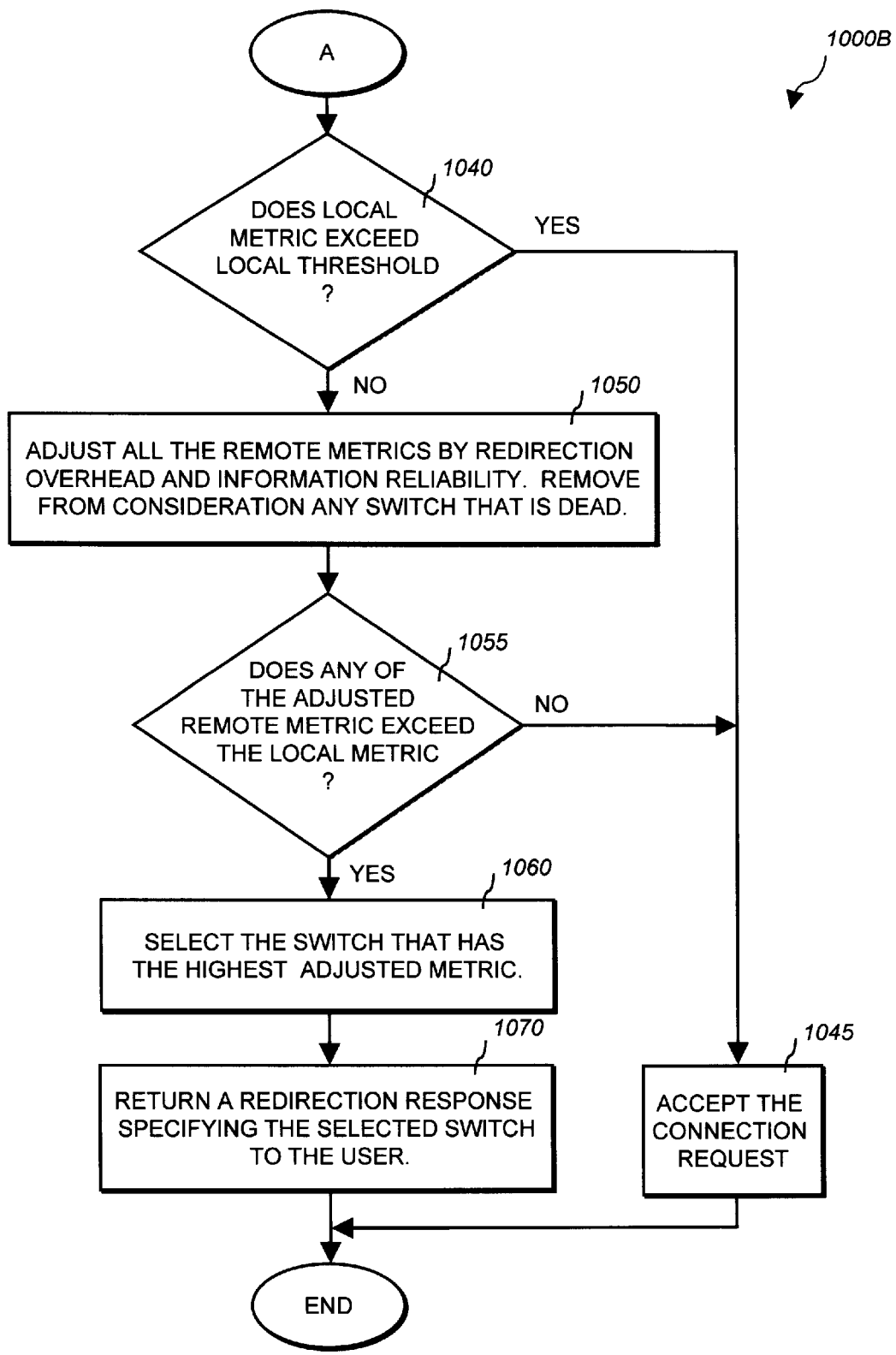
FIG. 10B is a flowchart illustrating a process to make a decision on whether to accept or redirect a connection request according to one embodiment of the invention.

FIG. 10B is a flowchart illustrating a process 1000B to make a decision on whether to accept or redirect a connection request according to one embodiment of the invention.

The process 1000B first determines if the local metric exceeds the local threshold $T_L$ (Block 1040). If yes, the process 1000B accepts the connection request and is terminated. Otherwise, the process 1000B adjusts all the remote metrics by the redirection overhead and their information reliability (e.g., their TTL values), and removes from consideration any switch that is dead (e.g., their TTL value is zero) (Block 1050).

Next, the process 1000B determines if any of the adjusted metrics of the remote switches exceeds the metric of the local switch (Block 1055). If no, the local metric is considered the best metric and the process 1000B accepts the connection request (Block 1045) and is then terminated. Otherwise, the process 1000B selects the remote switch that has the highest adjusted metric (Block 1060). Then, the process 1000B returns a redirection response specifying the selected switch to the user (Block 1070). Alternatively, the process 1000B can proceed to redirect the connection request to the selected switch without informing the user. Then the process 1000B is terminated.

The load balancing can be implemented by a number of methods. In one embodiment, the load balancing is implemented by software. In another embodiment, the load balancer is implemented by hardware, or a combination of hardware or software.

Figure 11:
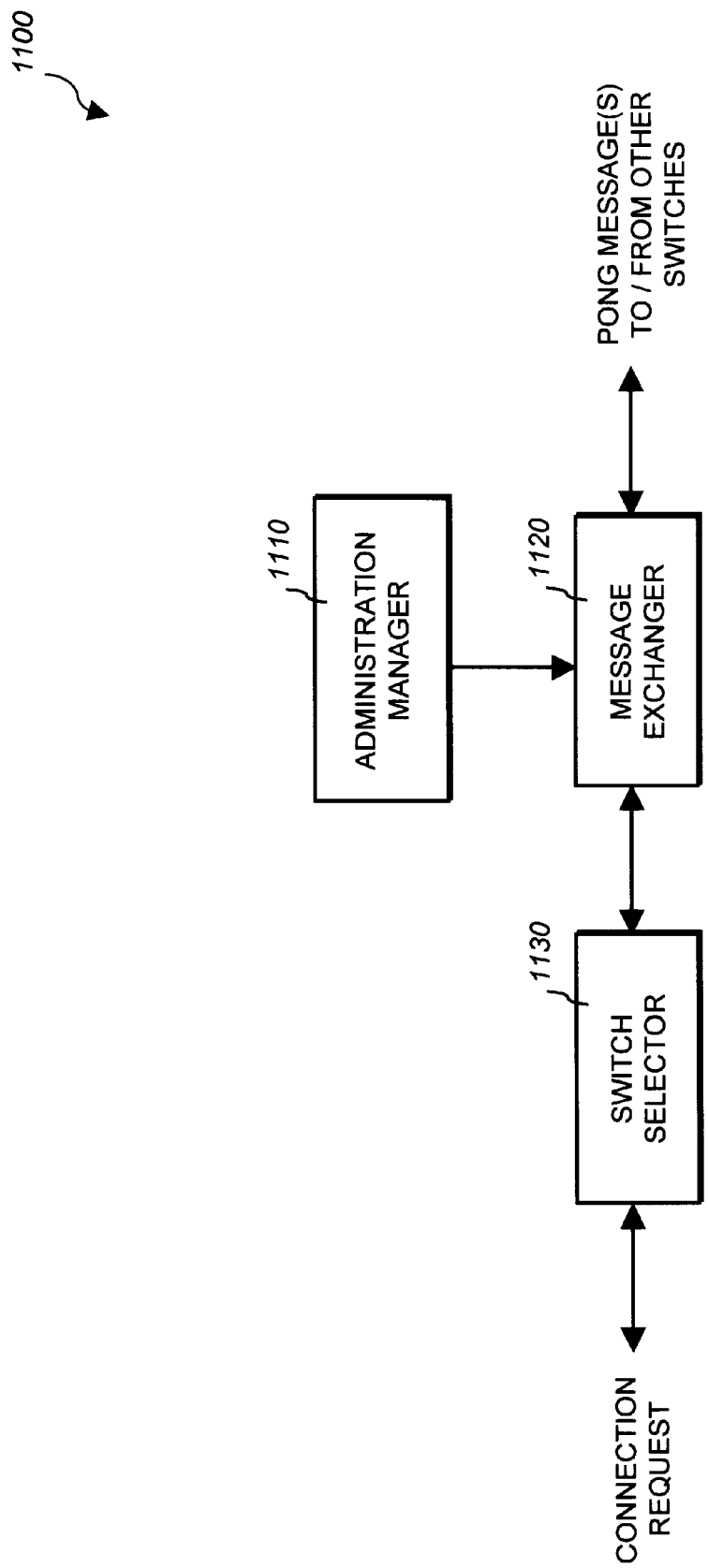
FIG. 11 is a diagram illustrating a load balancer according to one embodiment of the invention.

FIG. 11 is a diagram illustrating a load balancer 1100 according to one embodiment of the invention. The load balancer 1100 includes an administration manager 1110, a message exchanger 1120, and a switch selector 1130.

The administration manager 1110 allows an administrator to configure all aspects of the behavior of the switch. For load balancing, the administration manager 1110 specifies the QoS settings for users, defines the peer switches, defines the public interface addresses, and specifies whether load balancing is enabled for a switch.

The message exchanger 1120 performs the exchanging of load information among the switches in the cluster. The message exchanger 1120 receives set-up information from the administration manager 1110. The message exchanger 1120 receives Pong messages from other switches and transmits its Pong message to other switches. The message exchanger 1120 includes switch attributes that are used by the switch selector 1130.

The switch selector 1130 receives a connection request from a user and decides on whether to accept the connection request or to redirect to another switch in the cluster. The switch selector 1130 makes the decision based on the information from the message exchanger 1120.

Figure 12:
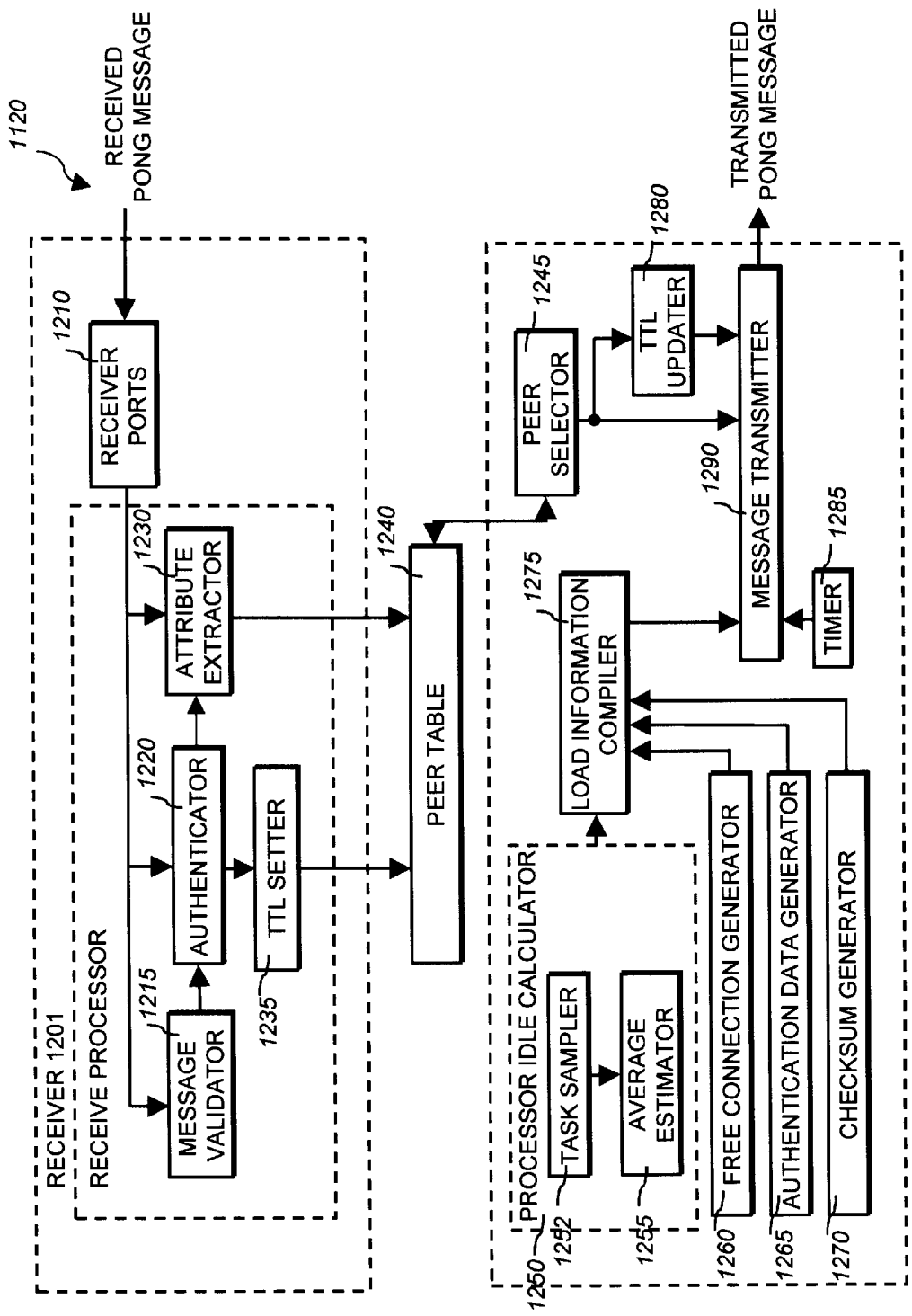
FIG. 12 is a diagram illustrating a message exchanger according to one embodiment of the invention.

FIG. 12 is a diagram illustrating a message exchanger 1120 shown in FIG. 11 according to one embodiment of the invention. The message exchanger 1120 includes a receiver 1201, a peer table 1240, and a sender 1202.

The receiver 1201 includes a receive port 1210, a message validator 1215, an authenticator 1220, a TTL setter 1225, and an attribute extractor 1230. The receive port 1210 receives the Pong messages sent by other switches in the cluster. The message validator 1215 validates the message received at the receive port 1210. The authenticator authenticates the Pong message after the Pong message is validated by the message validator 1215. The TTL setter 1225 sets the TTL value of the switch that sends the Pong message. The attribute extractor 1230 extracts the switch attributes such as free connections and processor idle time in the Pong message. The peer table 1240 stores the switch attributes and the TTL value.

The sender 1202 includes a peer selector 1245, a processor idle calculator 1250, a free connection generator 1260, an authentication data generator 1265, a checksum generator 1270, a load information compiler 1275, a TTL updater 1280, a timer 1285, and a message transmitter 1290. The peer selector 1245 selects a destination switch from the peer table 1240. The peer selector 1245 will go through the entire peer table 1240 and selects a switch to which a Pong message is sent. The processor idle calculator 1250 estimates the percentage of the processor idle time. The processor idle calculator 1250 includes a task sampler 1252 and an average estimator 1255. The task sampler 1252 samples the past tasks run by the processor based on some predetermined probability distribution, such as the Poisson distribution. The average estimator 1255 estimates the average of the percentage of the processor idle time using the history of past tasks provided by the task sampler 1252. The free connection generator 1260 obtains the free connection information from the switch processor. The free connection information includes the number of available sessions for a given connection priority. The authentication data generator 1265 generates the authentication data if required. The checksum generator 1270 computes the checksum for the message. The load information compiler 1275 compiles all the load information pertinent to the switch. The TTL updater 1280 updates the TTL value of the destination switch selected by the peer selector 1245. The timer 1285 generates a timing interrupt or flag based on the refresh interval. The message transmitter 1290 transmits the message to other switches as constructed from the load information compiler 1275 at the periodic intervals set by the timer 1285.

Figure 13:
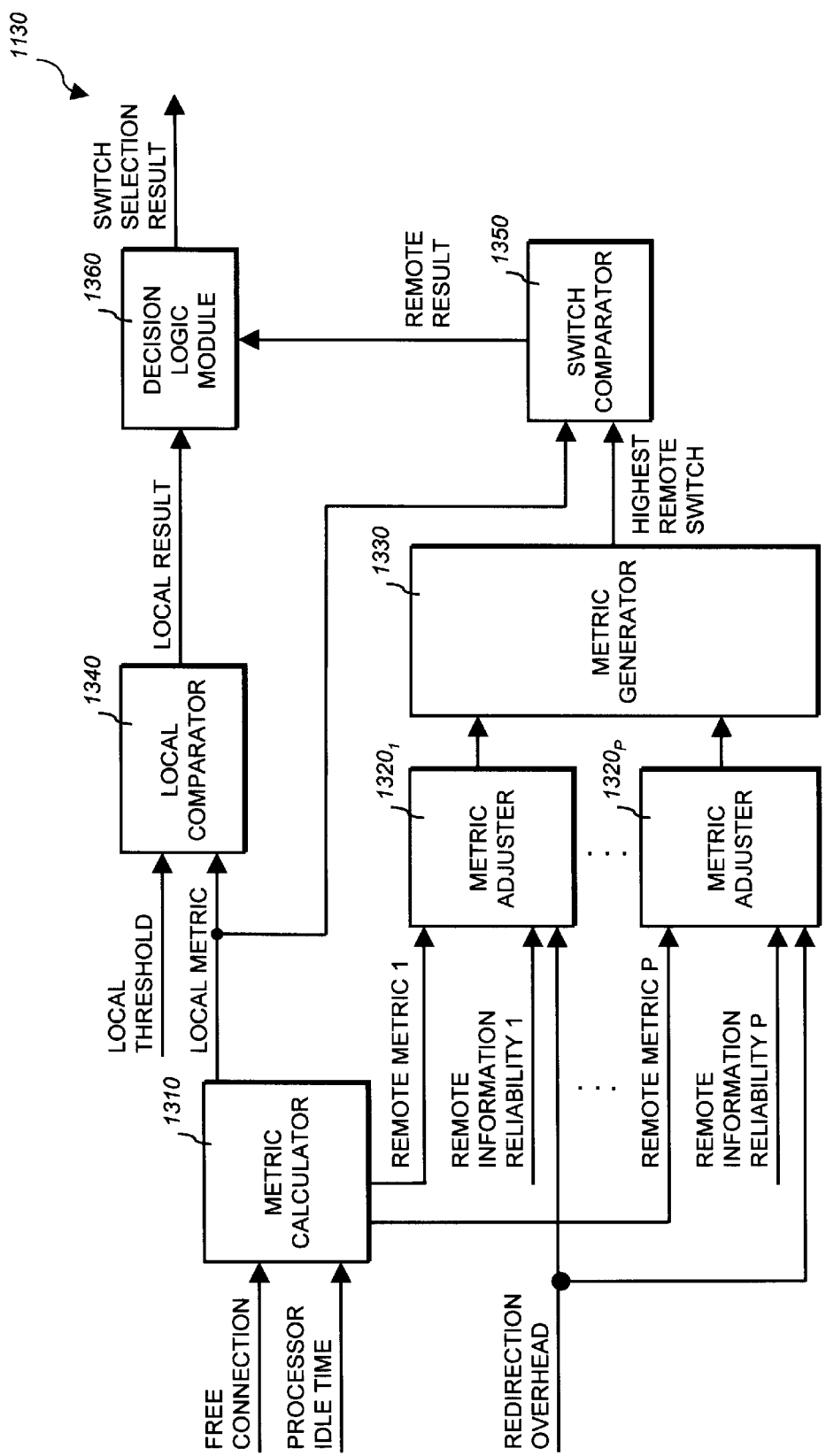
FIG. 13 is a diagram illustrating a switch selector according to one embodiment of the invention.

FIG. 13 is a diagram illustrating a switch selector 1130 as shown in FIG. 11 according to one embodiment of the invention. The switch selector includes a metric calculator 1310, P metric adjusters $1320_1$ to $1320_P$, a metric comparator 1330, a local comparator 1340, a switch comparator 1350, and a decision logic module 1360.

The metric calculator 1310 receives the switch attribute information such as the free connection information and the processor idle time. The metric calculator 1310 calculates the metric as shown in equation (1) and generates a local metric and P remote metrics corresponding to P remote switches. Each of the metric adjusters $1320_1$ to $1320_P$ receives the corresponding remote metric, the remote information reliability, and a redirection overhead. The metric adjusters $1320_1$ to $1320_P$ adjust the corresponding remote metrics using the remote information reliability (e.g., the TTL values) and the redirection overhead. The metric comparator 1330 compares all the adjusted remote metrics and selects the highest metric. The local comparator 1340 compares the local metric and the local threshold and generates a local result. The metric comparator 1350 compares the local metric and the highest adjusted remote metric and generates a remote result. The decision logic module 1360 receives the local and remote results and generates the decision on which switch to service the connection request.

Thus, the present invention is a technique to balance the load of a switch in a network in response to a connection request. The technique provides a protocol by which switches in a cluster exchange load information. The decision to select the best switch to respond to the connection request is based on the availability of sessions of the corresponding priority and the processor idle time.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method to balance load in a cluster of switches in a network, the switches including a local switch and one or more remote switches, the method comprising:

exchanging messages among the switches, the messages including an advertise message sent at a refresh interval, the advertise message containing load information of the switches including at least one of a version number, a message type, the refresh interval, an authentication method, a source address, a public address, a checksum, a processor idle time, a free connection, and an authentication data, the exchanging the messages comprising:
receiving the advertise message from a source switch, the advertise message containing the load information of the source switch including a switch attribute, the receiving an advertise message comprising:
listening on a broadcast port, and
processing the advertise message to extract the switch attribute, and storing the switch attribute in a peer table; and
selecting one of the switches in response to a connection request to the local switch based on a metric; wherein processing the advertise message comprises:
validating the checksum;
authenticating the advertise message using the authentication method and the authentication data;
validating the source address;
validating at least one of the version number, the message type, and the refresh interval;
setting a time-to-live (TTL) value using a predetermined maximum TTL value; and
extracting the switch attribute.

2. The method of claim 1 wherein the switch attribute includes at least one of a state, the TTL value, the processor idle time, and the free connection.

3. The method of claim 2 wherein the free connection includes a number of available sessions corresponding to a connection priority.

4. The method of claim 1 wherein exchanging the messages comprises:
selecting a destination switch from a peer table;
determining the load information of a source switch; and
sending an advertise message from the source switch to the selected destination switch, the advertise message containing the load information.

5. The method of claim 4 wherein the peer table contains a switch attribute of the destination switch.

6. The method of claim 5 wherein the switch attribute includes at least one of a state, a time-to-live (TTL) value, a processor idle time, and a free connection.

7. The method of claim 6 wherein the free connection includes a number of available sessions corresponding to a connection priority.

8. The method of claim 7 wherein selecting a destination switch comprises:
selecting the destination switch if the state of the destination switch indicates the destination switch is in a normal state.

9. The method of claim 8 wherein determining the load information comprises:
determining the processor idle time of the source switch; and
determining the free connection of the source switch.

10. The method of claim 9 wherein determining the load information further comprises:
   determining the authentication data of the source switch; and
   computing the checksum of the authentication data.

11. The method of claim 9 wherein determining the processor idle time comprises:
   obtaining samples of task idle times based on a probabilistic distribution; and
   estimating an average of the samples of task idle times based on an autoregressive moving average model, the average corresponding to the processor idle time.

12. The method of claim 11 wherein the probabilistic distribution is a Poisson distribution.

13. The method of claim 11 wherein the autoregressive moving average model is an exponentially weighted moving average.

14. The method of claim 6 further comprises:
   updating the TTL value of the destination switch.

15. The method of claim 1 wherein selecting one of the switches comprises:
   computing the metric using the free connection and a percentage of the processor idle time for each switch, the free connection including a number of available sessions corresponding to a connection priority of the connection request.

16. The method of claim 15 wherein the selected one of the switches corresponds to a best metric of the computed metrics of the switches.

17. The method of claim 16 wherein the best metric is determined based on at least one of a predetermined local threshold, a redirection overhead, and a remote information reliability.

18. The method of claim 17 further comprises:
   accepting the connection request by the local switch if the metric of the local switch exceeds the predetermined local threshold.

19. The method of claim 18 further comprises:
   adjusting the metric of the one or more remote switches based on at least one of the redirection overhead and the remote information reliability;
   redirecting the connection request to one of the one or more remote switches if the adjusted metric of the one of the one or more remote switches is the highest metric and higher than the metric of the local switch; and
   accepting the connection request by the local switch if the metric of the local switch is higher than the highest adjusted metric of the one or more remote switches.

20. A computer program product comprising:
   a computer usable medium having computer program code embodied therein to balance load in a cluster of switches in a network, the switches including a local switch and one or more remote switches, the computer program product having:
   computer readable program code for exchanging messages among the switches, the messages including an advertise message sent at a refresh interval, the advertise message containing load information of the switches including at least one of a version number, a message type, the refresh interval, an authentication method, a source address, a public address, a checksum, a processor idle time, a free connection, and an authentication data, the computer readable program code for exchanging messages comprising:
   computer readable program code for receiving the advertise message from a source switch, the advertise message containing the load information of the source switch including a switch attribute, the computer readable program code for receiving the advertise message comprising:
      computer readable program code for listening on a broadcast port,
      computer readable program code for processing the advertise message to extract the switch attribute, and
      computer readable program code for storing the switch attribute in a peer table; and
   computer readable program code for selecting one of the switches in response to a connection request to the local switch based on a metric; wherein the computer readable program code for processing the advertise message comprises:
   computer readable program code for validating the checksum;
   computer readable program code for authenticating the advertise message using the authentication method and the authentication data;
   computer readable program code for validating the source address;
   computer readable program code for validating at least one of the version number, the message type, and the refresh interval;
   computer readable program code for setting a time-to-live (TTL) value using a predetermined maximum TTL value; and
   computer readable program code for extracting the switch attribute.

21. The computer program product of claim 20 wherein the switch attribute includes at least one of a state, the TTL value, the processor idle time, and the free connection.

22. The computer program product of claim 21 wherein the free connection includes a number of available sessions corresponding to a connection priority.

23. The computer program product of claim 1 wherein computer readable program code for exchanging messages comprises:
   computer readable program code for selecting a destination switch from a peer table;
   computer readable program code for determining the load information of a source switch; and
   computer readable program code for sending an advertise message from the source switch to the selected destination switch, the advertise message containing the load information.

24. The computer program product of claim 23 wherein the peer table contains a switch attribute of the destination switch.

25. The computer program product of claim 24 wherein the switch attribute includes at least one of a state, a time-to-live (TTL), value, a processor idle time, and a free connection.

26. The computer program product of claim 25 wherein the free connection includes a number of available sessions corresponding to a connection priority.

27. The computer program product of claim 26 wherein the computer readable program code for selecting the destination switch comprises:
   computer readable program code for selecting the destination switch if the state of the destination switch indicates the destination switch is in a normal state.

28. The computer program product of claim 27 wherein the computer readable program code for determining the load information comprises:
    computer readable program code for determining the processor idle time of the source switch; and
    computer readable program code for determining the free connection of the source switch.

29. The computer program product of claim 28 wherein the computer readable program code for determining the load information further comprises:
    computer readable program code for determining the authentication data of the source switch; and
    computer readable program code for computing the checksum of the authentication data.

30. The computer program product of claim 28 wherein the computer readable program code for determining the processor idle time comprises:
    computer readable program code for obtaining samples of task idle times based on a probabilistic distribution; and
    computer readable program code for estimating an average of the samples of task idle times based on an autoregressive moving average model, the average corresponding to the processor idle time.

31. The computer program product of claim 30 wherein the probabilistic distribution is a Poisson distribution.

32. The computer program product of claim 30 wherein the autoregressive moving average model is an exponentially weighted moving average.

33. The computer program product of claim 25 further comprises:
    computer readable program code for updating the TTL value of the destination switch.

34. The computer program product of claim 20 wherein the computer readable program code for selecting one of the switches comprises:
    computer readable program code for computing the metric using the free connection and a percentage of the processor idle time for each switch, the free connection including a number of available sessions corresponding to a connection priority of the connection request.

35. The computer program product of claim 34 wherein the selected one of the switches corresponds to a best metric of the computed metrics of the switches.

36. A computer data signal embodied in a carrier wave comprising:
    a load balancing code segment to balance load in a cluster of switches in a network, the switches including a local switch and one or more remote switches, the load balancing code segment having:
    a message exchange code segment for exchanging messages among the switches, the messages including an advertise message sent at a refresh interval, the advertise message containing load information of the switches including at least one of a version number, a message type, the refresh interval, an authentication method, a source address, a public address, a checksum, a processor idle time, a free connection, and an authentication data, the message exchange code segment comprising:
        a receive code segment for receiving the advertise message from a source switch, the advertise message containing the load information of the source switch, including a switch attribute, the receive code segment comprising:
            a listening code segment for listening on a broadcast port, and
            a processing code segment for processing the advertise message to extract the switch attribute, and
        a store code segment for storing the switch attribute in a peer table; and
    a switch selecting code segment for selecting one of the switches in response to a connection request to the local switch based on a metric; wherein the processing code segment comprises:
        a first validation code segment for validating the checksum;
        a first authentication code segment for authenticating the advertise message using the authentication method and the authentication data;
        a second validation code segment for validating the source address;
        a third validation code segment for validating at least one of the version number, the message type, and the refresh interval;
        a setting code segment for setting a time-to-live (TTL) value using a predetermined maximum TTL value; and
        an extracting code segment for extracting the switch attribute.

37. The computer data signal of claim 36 wherein the switch attribute includes at least one of a state, the TTL value, the processor idle time, and the free connection.

38. The computer data signal of claim 37 wherein the free connection includes a number of available sessions corresponding to a connection priority.

39. The computer data signal of claim 36 wherein the message exchange code segment comprises:
    a peer code segment for selecting a destination switch from a peer table;
    a load code segment for determining the load information of a source switch; and
    a sender code segment for sending an advertise message from the source switch to the selected destination switch, the advertise message containing the load information.

40. The computer data signal of claim 39 wherein the peer table contains a switch attribute of the destination switch.

41. The computer data signal of claim 40 wherein the switch attribute includes at least one of a state, a time-to-live (TTL) value, a processor idle time, and a free connection.

42. The computer data signal of claim 41 wherein the free connection includes a number of available sessions corresponding to a connection priority.

43. The computer data signal of claim 42 wherein the peer code segment comprises:
    a destination code segment for selecting the destination switch if the state of the destination switch indicates the destination switch is in a normal state.

44. The computer data signal of claim 43 wherein the load code segment comprises:
    an idle code segment for determining the processor idle time of the source switch; and
    a connection code segment for determining the free connection of the source switch.

45. The computer data signal of claim 44 wherein the load code segment further comprises:
    a second authentication code segment for determining the authentication data of the source switch; and
    a checksum code segment for computing the checksum of the authentication data.

46. The computer data signal of claim 44 wherein the idle code segment comprises:

a sampling code segment for obtaining samples of task idle times based on a probabilistic distribution; and an averaging code segment for estimating an average of the samples of task idle times based on an autoregressive moving average model, the average corresponding to the processor idle time.

47. The computer data signal of claim 46 wherein the probabilistic distribution is a Poisson distribution.

48. The computer data signal of claim 46 wherein the autoregressive moving average model is an exponentially weighted moving average.

49. The computer data signal of claim 41 further comprises:

an update code segment for updating the TTL value of the destination switch.

50. The computer data signal of claim 36 wherein the switch selecting code segment comprises:

a metric code segment for computing the metric using the free connection and a percentage of the processor idle time for each switch, the free connection including a number of available sessions corresponding to a connection priority of the connection request.

51. The computer data signal of claim 50 wherein the selected one of the switches corresponds to a best metric of the computed metrics of the switches.

52. The apparatus of claim 1 wherein a switch selector comprises:

a metric generator to compute the metric using the free connection and a percentage of the processor idle time for each switch, the free connection including a number of available sessions corresponding to a connection priority of the connection request, the metric generator generating a local metric corresponding to the local switch and one or more remote metrics corresponding to the one or more remote switches.

53. The apparatus of claim 52 wherein the selected one of the switches corresponds to a best metric of the computed metrics of the switches.

54. The apparatus of claim 53 wherein the best metric is determined based on at least one of a predetermined local threshold, a redirection overhead, and a remote information reliability.

55. The apparatus of claim 54 further comprises:

a local comparator to compare the metric of the local switch and the predetermined local threshold, the local comparator generating a local result.

56. The apparatus of claim 55 further comprises:

one or more metric adjusters coupled to the metric calculator to adjust the metric of the one or more remote switches based on at least one of the redirection overhead and the remote information reliability;

a first metric comparator coupled to the one or more metric adjusters to compare the adjusted metrics of the one of the one or more remote switches, the metric comparator generating a highest adjusted metric from the adjusted metrics;

a second metric comparator coupled to the first metric comparator and the metric calculator to compare the highest adjusted metric and the local metric, the second metric comparator generating a remote result; and a decision logic coupled to the local comparator and the metric comparator to generate a decision based on the local and remote results, the decision accepting the connection request by the local switch if the local metric is higher than the local threshold or is higher than the highest adjusted metric.

57. A system comprising:

a processor; and a memory coupled to the processor, the memory including program code to balance load in a cluster of switches including a local switch and at least one remote switch, the program code, when executed by the processor, causing the processor to:

exchange messages among the switches, the messages including an advertise message sent at a refresh interval, the advertise message containing load information of the switches, including at least one of a version number, a message type, the refresh interval, an authentication apparatus, a source address, a public address, a checksum, a processor idle time, a free connection, and an authentication data, the program code causing the processor to exchange messages comprising program code causing the processor to receive the advertise message from a source switch, the advertise message containing the load information of the source switch including a switch attribute; and program code causing the processor to store the switch attribute in a peer table, the program code causing the processor to receive comprising program code causing the processor to listen on a broadcast port, and process the advertise message to extract the switch attribute; and select one of the switches in response to a connection request to the local switch based on a metric; wherein the program code causing the processor to select one of the switches comprises program code causing the processor to validate the checksum, authenticate the advertise message using the authentication method and the authentication data, validate the source address, validate at least one of the version number, the message type, and the refresh interval, set a time-to-live (TTL) value using a predetermined maximum TTL value, and extract the switch attribute.

58. A system comprising:

a plurality of switches including a local switch and a remote switch; and a load balancer coupled to the plurality of switches, the load balancer including:

a message exchanger to exchange messages including an advertise message sent at a refresh interval, the advertise message containing load information among the plurality of switches including at least one of a version number, a message type, the refresh interval, an authentication apparatus, a source address, a public address, a checksum, a processor idle time, a free connection, and an authentication data, the message exchanger comprising:

a receiver to receive the advertise message from a source switch, the advertise message containing the load information of the source switch including a switch attribute, the receiver comprising a listener to listen on a broadcast port, and a message processor to process the advertise message to extract the switch attribute, and a peer table coupled to the receiver to store the switch attribute; and a switch selector coupled to the message exchanger to select one of the plurality of switches in response to a connection request to the local switch based on a metric; wherein the message processor comprises a first validator to validate the checksum, a first authenticator to authenticate the advertise message using the authentication method and the authentication data, a second validator to validate the source address, a third validator to validate at least one of the version number, the message type, and the refresh interval, a setter to set a time-to-live (TTL) value using a predetermined maximum TTL value, and an attribute extractor to extract the switch attribute.

59. An apparatus to balance load in a cluster of switches in a network, the switches including a local switch and one or more remote switches, the apparatus comprising:

a message exchanger to exchange messages among the switches, the messages including an advertise message sent at a refresh interval, the advertise message containing load information of the switches including at least one of a version number, a message type, the refresh interval, an authentication apparatus, a source address, a public address, a checksum, a processor idle time, a free connection, and an authentication data, the message exchanger comprising:

a receiver to receive the advertise message from a source switch, the advertise message containing the load information of the source switch including a switch attribute, the receiver comprising a listener to listen on a broadcast port, and a message processor to process the advertise message to extract the switch attribute, and a peer table coupled to the receiver to store the switch attribute; and a switch selector coupled to the message exchanger to select one of the switches in response to a connection request to the local switch based on a metric; wherein the message processor comprises a first validator to validate the checksum, a first authenticator to authenticate the advertise message using the authentication method and the authentication data, a second validator to validate the source address, a third validator to validate at least one of the version number, the message type, and the refresh interval, a setter to set a time-to-live (TTL) value using a predetermined maximum TTL value, and an attribute extractor to extract the switch attribute.

* * * * *